(12) United States Patent
Magganmane et al.

(10) Patent No.: US 10,554,633 B2
(45) Date of Patent: Feb. 4, 2020

(54) ENHANCED PACKET FORMATING FOR SECURITY INTER-COMPUTING SYSTEM COMMUNICATION

(71) Applicant: ColorTokens, Inc., Santa Clara, CA (US)

(72) Inventors: Harish Magganmane, San Jose, CA (US); Ravi Voleti, Fremont, CA (US); Ashish Trivedi, Fremont, CA (US); Deepak Mohanty, Fremont, CA (US); Charles Kuta, Los Gatos, CA (US); Anoop Kapoor, San Jose, CA (US); Pankaj Parekh, Santa Clara, CA (US)

(73) Assignee: COLORTOKENS, INC. CA (US)

( * ) Notice: Subject to any disclaimer, the term of this patent is extended or adjusted under 35 U.S.C. 154(b) by 170 days.

(21) Appl. No.: 15/708,421

(22) Filed: Sep. 19, 2017

(65) Prior Publication Data

US 2019/0089680 A1   Mar. 21, 2019

(51) Int. Cl.
*H04L 29/06*   (2006.01)
*H04L 9/32*   (2006.01)

(52) U.S. Cl.
CPC ........ *H04L 63/0428* (2013.01); *H04L 9/3242* (2013.01); *H04L 63/065* (2013.01)

(58) Field of Classification Search
CPC .................................................. H04L 63/0428
USPC ...................................................... 713/161
See application file for complete search history.

(56) References Cited

U.S. PATENT DOCUMENTS

| | | | |
|---|---|---|---|
| 6,256,493 B1* | 7/2001 | Dorenbosch | H04M 3/42 340/7.39 |
| 6,981,278 B1* | 12/2005 | Minnig | H04L 29/12367 709/245 |
| 7,454,489 B2* | 11/2008 | Chauffour | H04L 67/1027 709/223 |
| 7,519,834 B1* | 4/2009 | Dondeti | H04L 63/065 713/190 |
| 8,601,263 B1* | 12/2013 | Shankar | H04L 63/0428 713/166 |
| 8,667,170 B2* | 3/2014 | Matsuura | H04L 29/12009 709/218 |
| 2005/0283604 A1* | 12/2005 | Deshpande | H04L 45/745 713/160 |
| 2009/0034557 A1* | 2/2009 | Fluhrer | H04L 41/0893 370/474 |
| 2017/0126469 A1* | 5/2017 | Liang | H04L 41/04 |
| 2019/0089680 A1* | 3/2019 | Magganmane | H04L 63/0428 |

* cited by examiner

*Primary Examiner* — Harris C Wang
(74) *Attorney, Agent, or Firm* — Barry Choobin; Patent 360 LLC

(57) ABSTRACT

Described herein are systems, methods, and software to enhance secure communications between computing systems. In one implementation, a communication service identifies a communication request for a first application on a first computing system to transfer data to a second application on a second computing system. In response to the request, the communication service generates a packet, wherein the packet includes an encrypted portion for the data and private addressing associated with the first and second applications, and an unencrypted portion for group identifier information and public addressing information. Once the packet is generated, the packet is transferred to the second computing system.

20 Claims, 6 Drawing Sheets

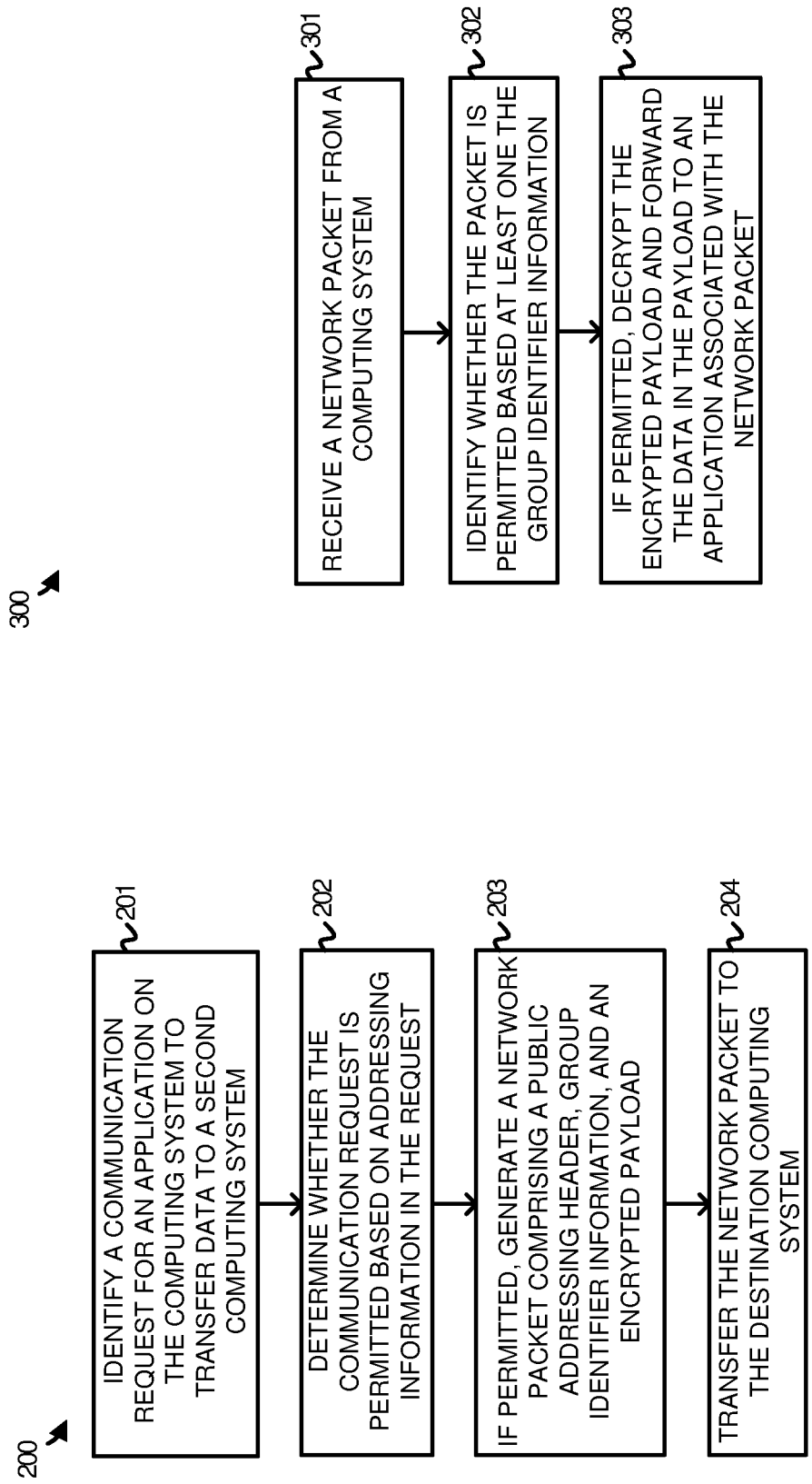

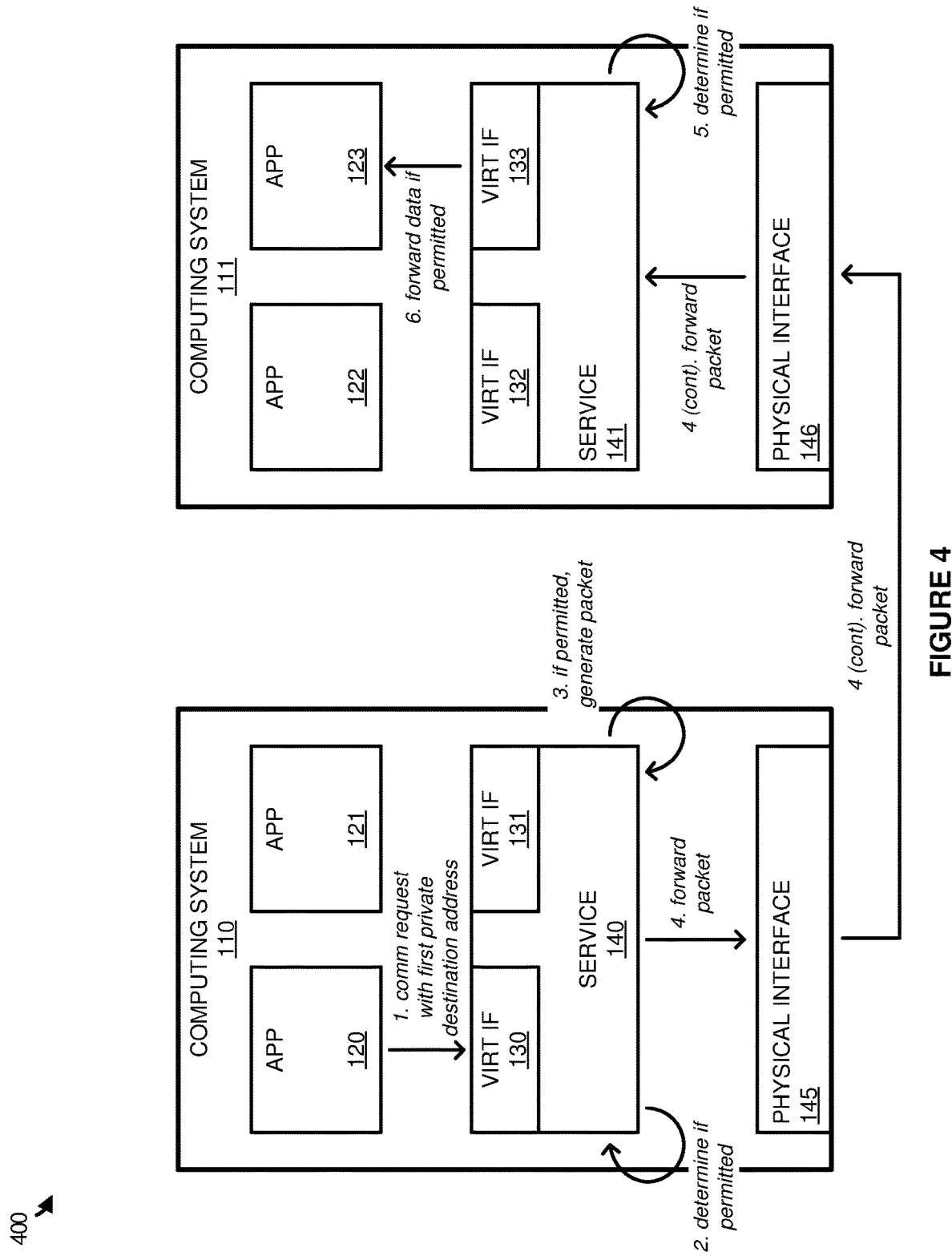

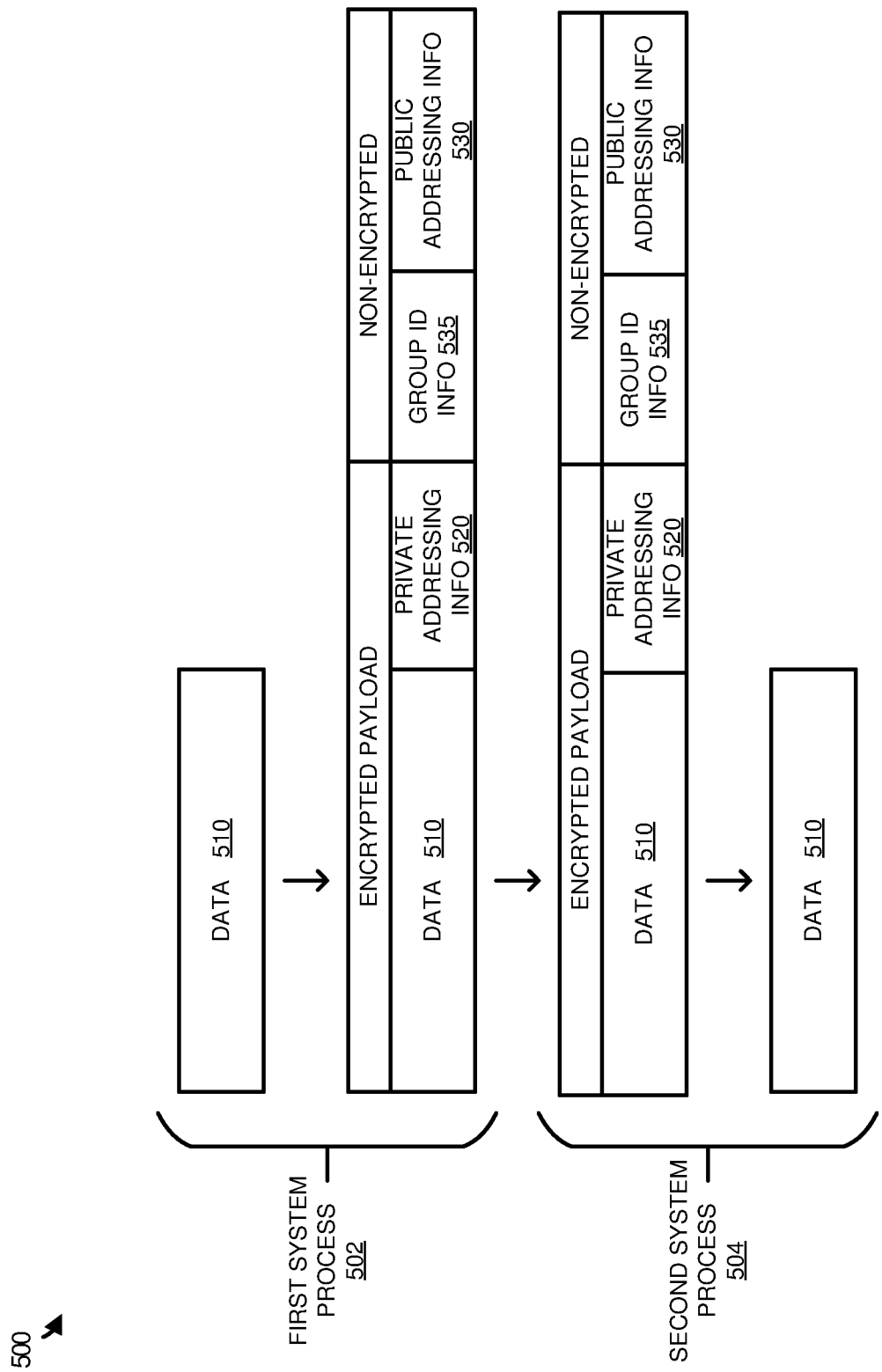

ENHANCED PACKET FORMATING FOR SECURITY INTER-COMPUTING SYSTEM COMMUNICATION

BACKGROUND

In computing networks, computing systems, both real and virtual, often include applications and services that require communications with other computing systems to provide desired operations. For example, an application on a first computing system may require data from a database located on a second computing system. Consequently, to provide the communication, the data payload may be placed in a network packet, and transferred to the required computing system. However, although network packets provide a method of communication between computing systems, difficulties often arise in managing security between the computing systems.

To overcome some of the deficiencies presented in securing network communications between computing systems, various technologies have been developed. These technologies include virtual local area networks (VLANs), encryption for the data payload within the data packets, amongst other similar security procedures. Yet, while the security technologies currently deployed may provide additional security over unprotected networks, management of deploying the security can often be difficult and cumbersome. Further, providing a cohesive inter-computing system security policy may be difficult without modifying the applications on the computing systems, and/or the configurations provided by switches, firewalls, routers, and other similar networking devices providing the connectivity to the computing systems.

Overview

The technology disclosed herein enhances security for inter-computing system communications. In one implementation, a method of managing communications for an application on a computing system includes identifying a communication request from an application on the computing system to transfer data to a second application on a second computing system, wherein the communication request is associated with private addressing information to address the second application, and wherein the application and the second application are associated with a communication group. The method further includes generating a network packet to support the communication request, wherein the network packet comprises an encrypted portion and a non-encrypted portion, wherein the encrypted portion comprises the data and the private addressing information, wherein the non-encrypted portion comprises public addressing information and group identifier information, and wherein the group identifier information indicates at least a communication group identifier for the communication group to decrypt the encrypted portion at the second computing system. The method also provides transferring the network packet to the second computing system.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 illustrates an operation of a computing system to provide secure communications according to an implementation.

FIG. 3 illustrates an operation of a computing system to provide secure communications according to an implementation.

FIG. 4 illustrates an operational scenario of a secure packet transfer according to an implementation.

FIG. 5 illustrates an overview of packet management to provide secure packet communication according to an implementation.

DETAILED DESCRIPTION

Figure 1:
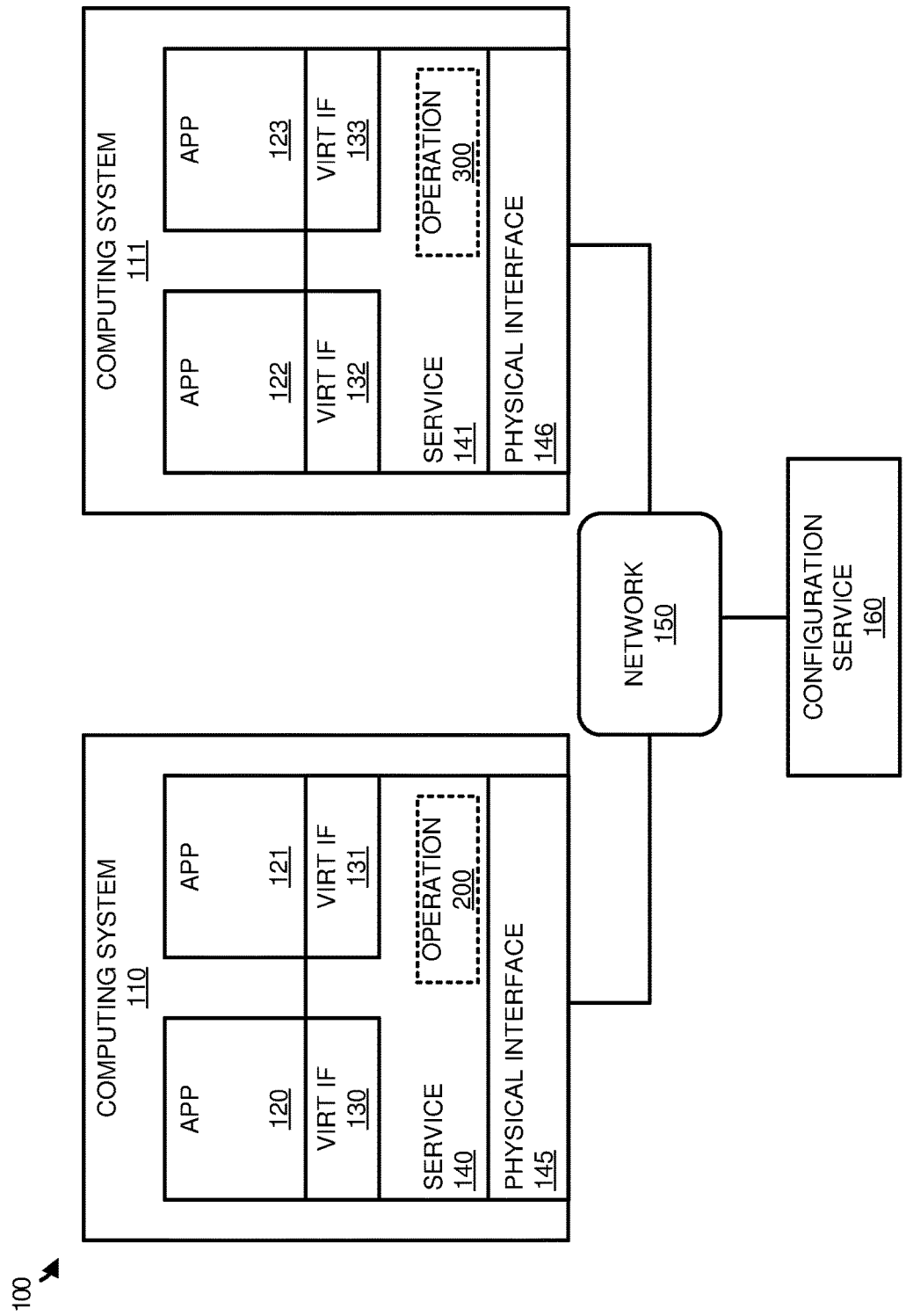
FIG. 1 illustrates a computing network to provide secure communications according to an implementation.

The various examples disclosed herein provide enhancements for managing secure data communications between computing systems. In particular, computing systems, both real and virtual, include various applications that often require communication with other computing systems to provide desired operations. For example, in an organization's computing network, a service application on a first computing system may require communications with a database on a second computing system. To provide this communication, a network packet may be generated at the first computing system in response to a communication request from the application and the packet may be transferred to the second computing system, wherein the network packet may include a header portion with addressing and protocol information and a payload portion that includes the data for the application.

Here, to improve the security of communications between computing systems, a computing system that is required to communicate with one or more other computing systems may be configured with a communication service that can identify and manage communications with the other computing systems. In a particular example, as a communication request is generated from an application on a computing system, rather than forwarding the communication to the Transmission Control Protocol/Internet Protocol (TCP/IP) portion of the operating system or other software element of the computing system, the packet may be forwarded to a communication service. This communication service, which may operate as part of or alongside the operating system, may determine whether the communication is permitted, and if permitted, configure a network packet for delivery to a second computing system with the data payload for the application and at least private addressing information to secure the communication.

In at least one example, the private addressing information may include at least a source private address for the application and, in some implementations, a destination private address for the destination application, a source port, a destination port, or some other similar private addressing information. In including the private addressing information, applications on the computing system may be provided with their own private or overlay network addressing, permitting the application to communicate with other applications (on supporting computing systems) that share the overlay network. An overlay network is a private network that is built on top of another network (sometimes referred to as an underlay network).

Once the application is allocated to an overlay network, the application may address other applications on the network using the private addressing information associated with the overlay network, wherein the communications are identified at a virtual network interface provided by the communication service. Once the request is received, the service may identify destination information (overlay network destination information) for the requested communication, and determine whether the communication is permitted. Once permitted, the service may identify public addressing information for addressing the destination computing system on the underlay network, and generate a packet that can be transferred to the second computing system. This packet may include an encrypted portion for the application data with the private addressing information (overlay addressing information), and include a non-encrypted portion with the public addressing information (underlay addressing information) and group identifier information for the requesting application.

This group identifier information is used by the destination computing system in determining how to process a received packet. In particular, the group identifier information may include a revision associated with the service, a group corresponding to the requesting application (i.e. an identifier that permits defined applications to communicate), and other relevant information to decrypt the payload of the packet. This information for decrypting the packet may include information about the length of the encrypted data payload, information about the sequence number of the packet, a keyed-hash message authentication code (HMAC), a peer identifier (peerID), an initialization vector (IV) or seed, or some other similar information, including combinations thereof. Based on the group identifier information, the receiving computing system may determine whether the packet is permitted (e.g. whether the packet can be decrypted and supplied to an associated application), or whether the communication should be blocked from being provided to the associated application.

FIG. 1 illustrates a computing network 100 to provide secure communications according to an implementation. Computing network 100 includes computing systems 110-111, network 150, and configuration service 160. Computing systems 110-111 further include applications 120-123, services 140-141, and physical interfaces 145-146. Service 140 is configured to provide operation 200 that is further described in FIG. 2, and service 141 is configured to provide operation 300 that is further described in FIG. 3.

In operation, computing systems 110-111 execute applications 120-123 to provide various operations including data processing, front-end management, image or video editing, productivity, or some other similar type of operation. To permit the applications to communicate with other computing systems and other approved applications, each of the systems includes services 140-141, which are used to identify communications, determine whether the communications are permitted, and generate secure packets for transfer to the destination computing system. In determining whether communications are permitted, computing systems 110-111 may communicate with configuration service 160 to obtain permissions for the applications on the computing system. In at least one example, a user of the computing system may provide credentials, such as a username and password, which are then provided to configuration service 160. In response to the request, configuration service 160 will identify permissions associated with credentials and provide the permissions to the corresponding service to manage communications on the devices.

In some implementations, the permissions information that is provided by configuration service 160 may define which computing systems and applications thereon that each computing system may communicate with. As an example, configuration service 160 may define that application 120 executing on computing system 110 is permitted to communicate with application 123. As a result, application 120 may use private addressing (overlay addressing) to address the application on the second computing system. This private addressing may be used to segregate applications and/or computing systems into different communication groups. Thus, whereas application 120 and application 123 may belong to the same communication group and share an overlay addressing space, applications 121 and 122 may be a part of a different communication group and share a different overlay addressing space.

In some implementations, applications 120-123 may share the namespace with the other applications on the same computing system. Thus, rather than providing networking for virtual machines or containers, services 140-141 may be used to provide secure networking operations for applications such as gaming applications, productivity applications, database applications, and the like that operate in the same namespace.

FIG. 2 illustrates an operation 200 of a computing system to provide secure communications according to an implementation. The processes of operation 200 are referenced parenthetically in the paragraphs that follow with reference to systems and elements of computing network 100 of FIG. 1. Although demonstrated as a communication request on computing system 110, it should be understood that similar operations may be provided by computing system 111.

As described herein, service 140 may request and receive communication permissions from configuration service 160, wherein the communication permissions are used in identifying what computing systems and applications are available for communications with computing system 110. Once the permissions are obtained, service 140 identifies (201) a communication request for an application on the computing system transfer data to a second computing system. In the present implementation, service 140 may be used to provide virtual network interfaces (VIRT IFS) 130-131. In providing these interfaces to the applications, service 140 may act as an intermediary for the applications to generate the required packets to be communicated over the network. In particular, each virtual network interface 130-131 may be allocated overlay or private network addressing information that can be used by the application in communicating with other applications that are part of the overlay network. As an example, application 120 on computing system 110 may be provided with a first private address and application 123 on computing system 110 may be provided with a second private address as part of the same overlay network.

After a communication request is received at service 140, service 140 determines (202) whether the communication request is permitted based on addressing information in the request and the maintained permission information. In making the determination, service 140 may identify at least the destination private address (IP address, uniform resource locator (URL), port, and the like), and may further identify the source private address for the communication (i.e. the address associated with the requesting application). Thus, returning to the example of application 120 attempting to communicate with application 123, service 140 may identify the destination private address associated with application 123 and determine whether to permit the communication based on the destination address. If the communication is permitted, operation 200 further generates (203) a network packet comprising a public addressing header, group identifier information, and an encrypted payload, and transfers (204) the network packet to the destination computing system.

First, the encrypted payload is used to encrypt the data for the application along with the private addressing (overlay addressing) information for the application. This encryption may be provided in some examples using the permissions information provide from configuration service 160. In particular, credentials or certificates may be provided with the permissions that are used to encrypt data for applications in the same communication group. Thus, when a communication is required, the private addressing information for the communication may be appended to the data of the application and, together, the data and addressing information may be encrypted using the associated encryption credentials. In some implementations, the encryption certificates provided by configuration service 160 may be different for each communication group. Thus, if application 120 and application 123 were in a first group, while applications 121-122 were in a second group, the first group may use different encryption mechanisms than the second group of applications.

Second, in addition to the encrypted portion of the packet, the non-encrypted portion of the packet may include group identifier information. This group identifier information is used in defining what communication group the communication belongs, as well as supplemental information that can be used in decrypting the packet. In some implementations, the group identifier information may include information about the length of the data payload, information about the sequence number of the packet, a keyed-hash message authentication code (HMAC), a peer identifier (peerID), an initialization vector (IV) or seed, or some other similar information, including combinations thereof. As an example, application 120 on computing system 110 may belong to a first communication group with a first group identifier, while application 121 may belong to a second communication group with a second group identifier. In this manner, the group identifiers may be used to notify the receiving computing system of which encryption credentials or certificates should be used in decrypting the payload, as well as the source of the communication. Additionally, the supplemental information (described above) may be used in providing any of the additional information required to decrypt the packet.

Finally, the third portion of the packet, includes the public network addressing or underlay network information, wherein the underlay network provides a platform for multiple overlay networks to operate on top of the addressing of the underlay network. This includes the public IP address for computing system 110 the public addressing information for computing system 111, port information for the communication and the like. As a result, although a single IP address may be allocated to the computing systems physical interface 145 (the underlay network address), the applications executing thereon may interact with other systems and applications using different addresses (addresses associated with the overlay network(s)). In some implementations, the public addressing information may be supplied as permission information from configuration service 160, wherein service 140 can associate the underlay addressing required from a communication request using the overlay or private addressing.

FIG. 3 illustrates an operation 300 of a computing system to provide secure communications according to an implementation. The processes of FIG. 3 are referenced parenthetically in the paragraphs that follow with reference to systems and elements of computing network 100 of FIG. 1. Although demonstrated in the example of FIG. 3 as receiving a communication at computing system 111, it should be understood that similar operations may be applied to a packet received at computing system 110.

As depicted in FIG. 3, operation 300 directs service 141 to receive (301) a network packet from a source computing system. In response to receiving the packet, service 141 identifies (302) whether the packet is permitted based at least in part on group identifier information included in the packet. As described previously in FIG. 2, when data is to be communicated from an application on a first computing system to an application on a second computing system, services 140-141 are used in generating secure packets. Within the packets, group identifier information is included that is used to define what communication group the communication belongs, along with information to decrypt the packet. In some implementations, a group identifier and service version identifier may be included in the group identifier information, wherein the identifiers may be used to determine which credentials to be used in decrypting the packet. Once the credentials are identified, operation 200 may decrypt (303) the payload of the packet and forward the data in the payload to an application associated with the network packet. In some implementations, in decrypting the packet the group identifier information may include additional or supplemental information that can be used in decrypting and processing the data packet. This information may include the length of the encrypted payload, a HMAC, a peerID, an initialization vector or seed, or some other similar information. As a result, this supplemental information included within the network packet, along with the maintained security credentials may be used in decrypting the packet and forwarding the packet to the required application.

FIG. 4 illustrates an operational scenario 400 of a secure packet transfer according to an implementation. Operational scenario 400 includes systems and elements from computing network 100 of FIG. 1. In particular, operational scenario includes computing systems 110-111, while network 150 and configuration service 160 have been omitted for clarity.

As depicted, application 120 initiates a communication request, at step 1, with a private destination address, wherein the private destination address corresponds to a second application that shares an overlay network with application 120. In the example of FIG. 4, application 120 provides a private destination address that corresponds to application 123 on computing system 111. In response to identifying the communication, service 140 may determine if the communication is permitted at step 2, and if permitted may generate a packet at step 3.

In determining whether the packet is permitted, service 140 may maintain permissions that indicate available destinations for packets on the same overlay network. For example, application 120 and application 123 may share an overlay or private network, and as a result application 120 may address application 123 using an IP address associated with the overlay network. When a destination address is identified that is permitted for application 120, service 140 may generate a network packet to be communicated over physical interfaces 145-146 to service 141. This packet includes a non-encrypted portion and an encrypted portion, wherein the non-encrypted portion will include underlay (public) addressing for the computing systems 110-111 and group identifier information, and wherein the encrypted portion may include overlay (private) addressing for the communication and the data for the application.

As described previously, the group identifier information may include a group identifier, a version identifier associated with the sending communication service (service 140), as well as other information to decrypt the packet. The group identifier may be used to separate different communication groups within the communication network. For example, applications 120 and 123 may be associated with a first group, while applications 121-122 may be belong to one or more other groups. Consequently, when applications 120 and 123 are communicating the group identifier may be different than when applications 121-122 are communicating. In some implementations, the group identifier may be used in verifying and decrypting the packet at the destination computing system.

Once the packet is generated, service 140 may forward, at step 4, the packet over physical network interfaces 145-146, where the packet is identified by service 141. Once obtained at service 141, service 141 may process, at step 5, the packet to determine whether the packet is permitted. In particular, service 141 may inspect the information in the group identifier information to determine how to decrypt the packet. Once the packet is decrypted using the information within the packet and encryption certificates provided from configuration service 160, then the payload data may be provided to the associated application. Here, because the packet is directed at application 123, service 141 may provide the packet to application 123 using virtual interface 133. In this manner, the applications may transparently communicate to one another using the overlay network addresses, but have their data encapsulated using services 140-141.

FIG. 5 illustrates an overview 500 of packet management to provide secure packet communication according to an implementation. Overview 500 includes first system process 502 that is representative of operations that may be provided on a first computing system, such as computing system 110, and second system process 504 that is representative of operations that may be provided on a receiving computing system, such as computing system 111. Overview 500 further includes data 510, private addressing information 520, group identifier (ID) information 535, and public addressing information 530.

In the present implementation, when an application requires a communication, the application may provide data 510, which is identified by a communication service executing on the computing system. In particular, the application may be allocated to a communication group, wherein the communication group may communicate via an overlay addressing scheme with other applications and computing systems allocated to the communication group. For example, in an organization, finance applications may be configured such that they can communicate with one or more computing systems that also belong to the finance group.

Once a communication request is received with the application data, the communication service may process the request to generate a data packet to support the communication request. In some examples, the application may provide private addressing information associated with the private network or overlay network associated with the application. Based on the private addressing information, the communication service may determine if the communication is permitted and generate the packet with private addressing information 520 (provided at least in part from the application), group ID information 535 and public addressing information 530. Private addressing information 520 may include private source and destination IP addresses, private source and destination ports, a communication protocol, or some other similar information for the data packet. Group identifier information 535 may include various information that can be used in verifying and decrypting the packet. In some examples, this information may include a group identifier associated with the communication group for the application, a service version identifier associated with the communication service, as well as other attributes associated with the encrypted portion of packet. Public addressing information 530, which is also included in the non-encrypted portion of the packet is also used in routing the communication between computing systems. In particular, the public addressing information may include source and destination IP addresses associated with an underlay network connection for the computing systems (e.g. the addresses allocated to physical interfaces 145-146), the ports that the services communicate over, and a protocol for the communication. These addresses and ports are different than the private addresses that are used by the applications on the computing system.

Figure 6:
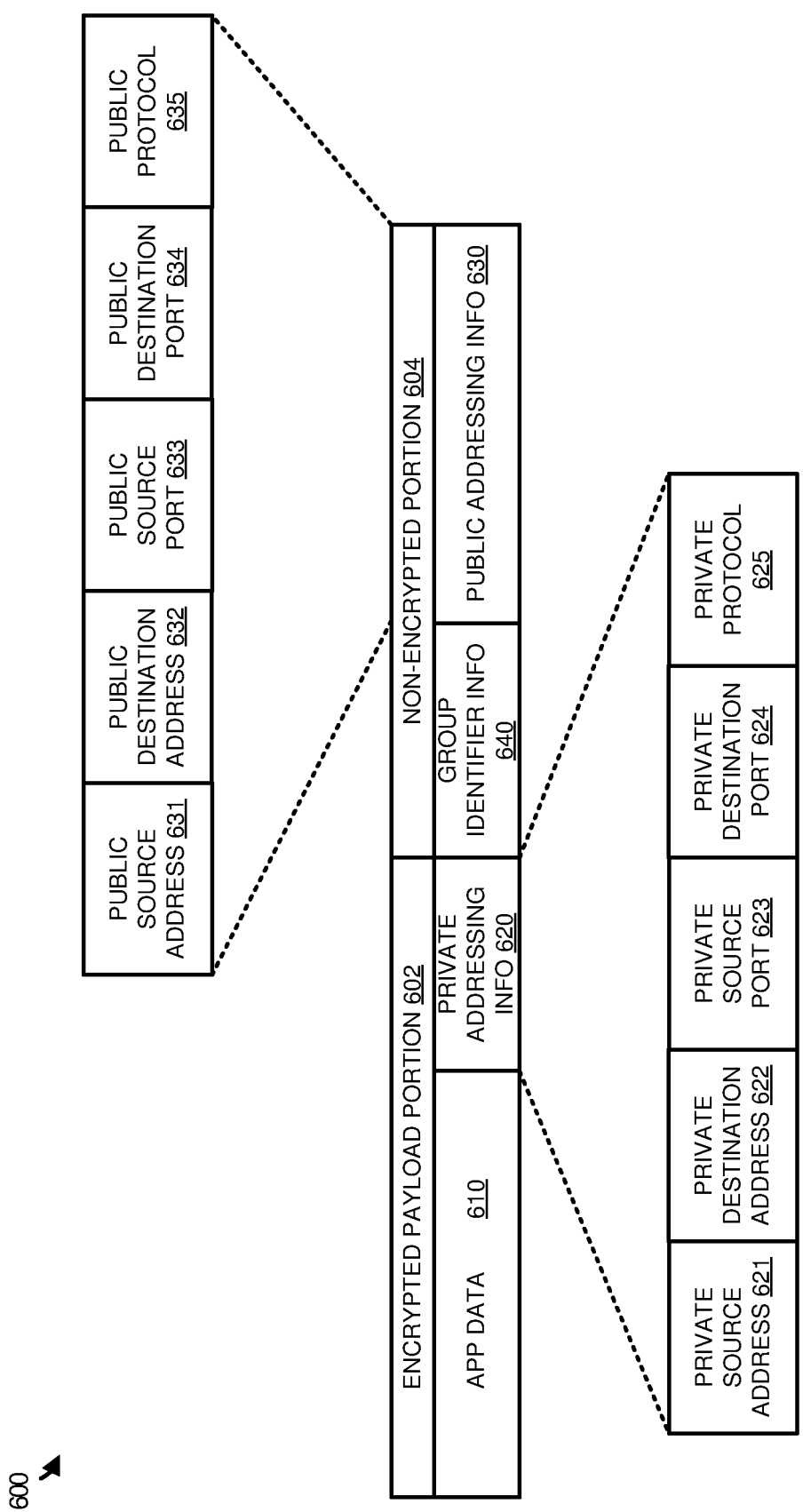
FIG. 6 illustrates a secured network packet according to an implementation.

Once the packet is generated and transferred to the receiving computing system, the receiving computing system and the communication service process the packet to extract the data from the packet. To provide this operation, the service will inspect group identifier information to determine how to decrypt the packet, and extract data 510 from the packet. In some implementations, to provide this decryption operation, the service may identify traits within the group identifier information, such as the group identifier, the service type, the length of the FIG. 6 illustrates a secured network packet 600 according to an implementation. Network packet 600 includes an encrypted payload portion 602 and a non-encrypted portion 604. Encrypted payload portion includes application data 610 and private addressing information 620, while non-encrypted portion 604 includes group identifier information 640 and public addressing information 630.

As described herein, a communication service that operates as part of or alongside the operating system of a computing system, will identify a communication request for an application. Once identified and the communication is permitted, the communication service may generate network packet 600 using permissions information (addressing and encryption parameters) provided by a configuration system. In the present example, the communication includes the application data 610, which corresponds to the data requested to be transmitted by the application, private addressing information 620 that is used as overlay addressing for the application in communicating with other applications and computing systems that are part of the overlay network, group identifier information 640, which is used in decrypting and providing security information for the packet, and public addressing information 630, which is used in the routing of the communications on the underlay communication network.

First, with respect to private addressing information 620, private addressing information 620 comprises addressing that is allocated to applications on a computing system by a configuration service. For example, the configuration service may be used to allocate financial client computing system applications with access to communicate with a financial database application on a separate computing system. In allocating these permissions, the configuration system may assign the computing systems (and associated applications) private addressing information to join the private overlay network. Here, when an application attempts to communicate with a second application on another computing system, the private addressing will include private source address 621 associated with the source application, destination address 622 associated with the destination application, private source port 623 associated with the source application, private destination port 624 associated with the destination application, and a private protocol 625 that is used by the communication between the applications.

Second, packet 600 includes group identifier information 640, which is used by the destination computing system to identify group (overlay network) associated with the packet, and decrypt information for decrypting the packet. This information may include information about the length of the data payload, information about the sequence number of the packet, a keyed-hash message authentication code (HMAC), a peer identifier (peerID), an initialization vector (IV) or seed for encryption, or some other similar information, including combinations thereof.

Third, packet 600 includes public addressing information 630, which is used in the overlay network to direct the packet to the destination computing system. In particular, public addressing information 630 includes at least public source address 631 corresponding to the source computing system, public destination address 632 corresponding to the destination computing system, public source port 633 corresponding to a port that is used by the source computing system for the communication service in general, public destination port 634 corresponding to a port that is used by the destination computing system for the communication service in general, and public protocol 635 that corresponds to a user datagram protocol for communicating between computing systems. It should be understood that the information in public addressing information 630 differs from that used in private addressing information 620.

Figure 7:
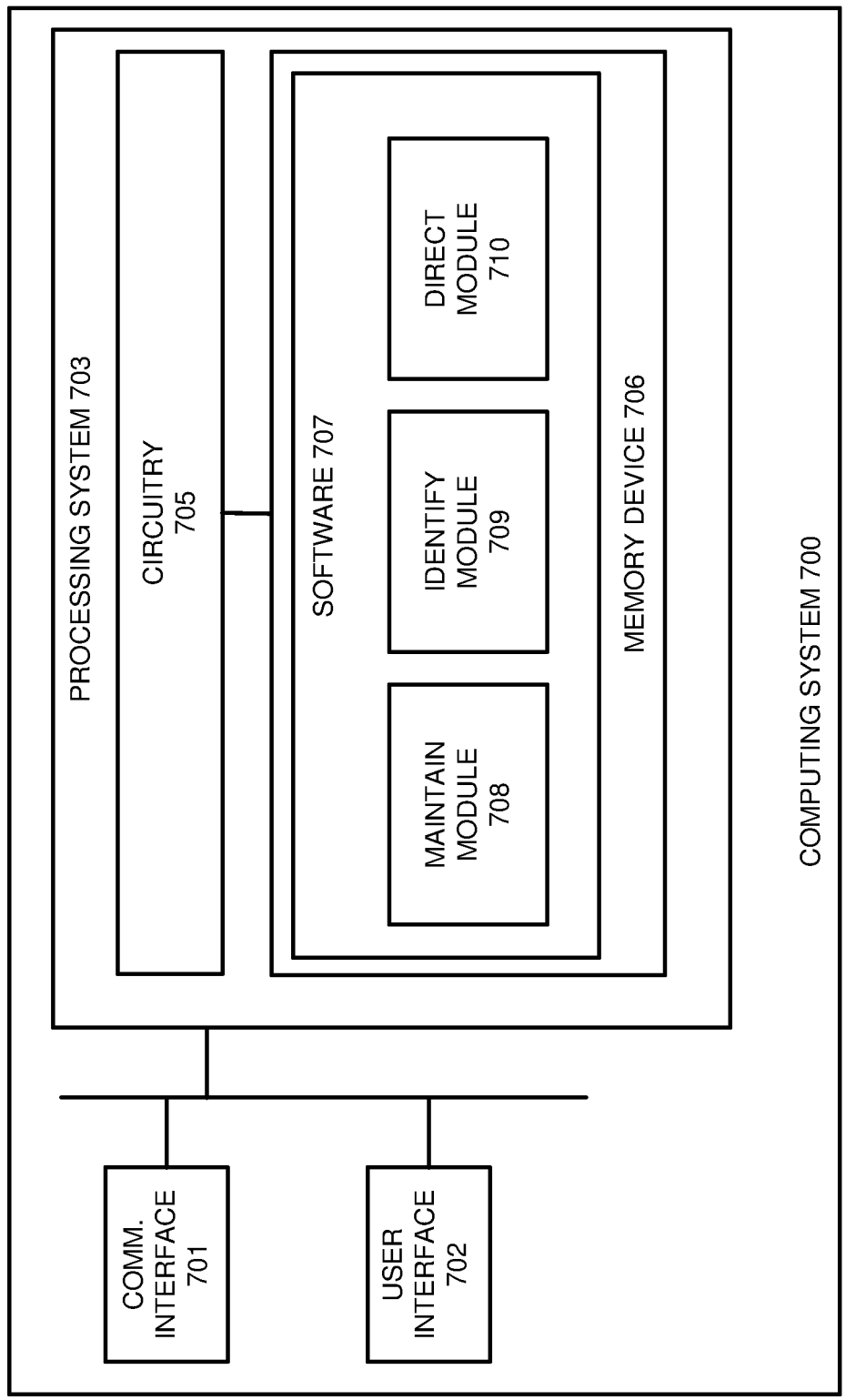
FIG. 7 illustrates a computing system capable of secure data communications according to an implementation.

FIG. 7 illustrates a computing system 700 capable of secure data communications according to an implementation. Computing system 700 is representative of any computing system or systems with which the various operational architectures, processes, scenarios, and sequences disclosed herein for a computing system with a communication service can be implemented. Computing system 700 is an example of computing systems 110-111, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In at least one implementation, communication interface 701 may be used to communicate with other end computing systems and a configuration system as described herein.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes maintain module 708, identify module 709, and direct module 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In operation, maintain module 708 when executed by processing system 703 directs processing system 703 to maintain permissions information for communication requests on the computing system. This permissions information, which may be provided by a configuration service or system, includes information about destination computing systems approved for communication, protocols that are approved to communicate with the destination computing systems, source and destination ports that are approved for communications, or some other similar permissions information. In some implementations, the permissions information may be used to allocate private addressing information (addresses, ports, protocols, etc.) to applications, permitting the applications to communicate with other applications on the same overlay private network. Additionally, the permissions information may include underlay network information (addresses, ports, protocols, etc.) that may be used in providing the communications between the systems, as well as group identifier information (group identifiers for the overlay networks and encryption certificates) to manage the separation of the overlay private networks.

While maintaining the permissions information, identify module 709 directs processing system 703 to identify a communication request from an application executing on the computing system. In response to the communication request, direct module 710 directs processing system 703 to forward the communication based on the permissions information.

In at least one example, responsive to the communication request, direct module 710 may direct processing system 703 to identify attributes for the requested communication, such as the requested destination port, destination IP, URL, URI, or other similar address, protocol request, or some other similar attribute for the request. Once the attributes are identified, direct module may compare the attributes to one or more data structures that can be used for maintaining the permissions information. If a match is identified in the one or more data structures that indicates the communication is permitted, then a network packet may be generated for the communication as described herein. In contrast, if a match is not identified in the one or more data structures that indicates that the communication is permitted, then the communication may be blocked.

In addition to private addressing information, direct module 710 further determines public addressing information for the network packet. This public addressing information may include public source and destination addresses (not reflective of the private addresses for the request), source and destination ports (not reflective of the request from the application), and protocol information (not reflective of the protocol defined by the communication request). Consequently, the public addressing information may be used to route the communication without revealing port or protocol information for the application data in the communication. In some examples, the public addressing information may be placed in a header for the network packet, wherein the header is not encrypted using the encryption keys and/or certificates. Once the packet is generated, direct module may forward the communication to the destination computing system.

In addition, to transferring a packet to a destination computing system, direct module 710 may also be used in receiving network packets from other computing systems. To provide this operation, when a packet is received, direct module 710 may identify group identifier information in the packet that can be used in identifying the overlay networking group for the packet, and information about how to decrypt the packet. Based on the group identifier information in the packet, the packet may be decrypted and forwarded to the appropriate application using the private addressing in the packet.

Returning to the elements of FIG. 1, computing systems 110-111 and configuration service 160 may each comprise communication interfaces, network interfaces, processing systems, computer systems, microprocessors, storage systems, storage media, or some other processing devices or software systems, and can be distributed among multiple devices. Computing systems 110-111 and configuration service 160 can each include software such as an operating system, logs, databases, utilities, drivers, natural language processing software, networking software, and other software stored on a computer-readable medium. Computing systems 110-111 and configuration service 160 may each comprise a serving computing system, a desktop computing system, or some other similar computing system. In some implementations, computing systems 110-111 may also represent virtual machines executing various applications.

Network 150 comprises network elements that provide communication services to computing system. Network 150 may comprise real and virtual switches, wireless access nodes, Internet routers, network gateways, application servers, computer systems, communication links, or some other type of communication equipment—including combinations thereof.

Communication between computing systems 110-111 and configuration service 160 may use metal, glass, optical, air, space, or some other material as the transport media. Communication between computing systems 110-111 and configuration service 160 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between computing systems 110-111 and configuration service 160 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing system comprising:
one or more non-transitory computer readable storage media;
a processing system communicatively coupled to the one or more non-transitory computer readable storage media; and
program instructions stored on the one or more non-transitory computer readable storage media to provide secure packet communications that, when read and executed by the processing system, direct the processing system to:
identify a communication request from at least one application on the computing system to transfer data to at least one second application on a second computing system, wherein the communication request is associated with private addressing information to address the at least one second application, and wherein the at least one application and the at least one second application are associated with one or more communication groups;
determine whether the communication request is permitted, the determination being based on the private addressing information and maintained permissions information, the maintained permissions information indicative of available destinations for the communication request;
generate a network packet to support the communication request if it is determined the communication request is permitted, wherein the network packet comprises an encrypted portion and a non-encrypted portion, wherein the encrypted portion comprises the data and the private addressing information, wherein the non-encrypted portion comprises public addressing information to address the second computing system and group identifier information, and wherein the group identifier information indicates at least an identifier for one of the one or more communication groups to decrypt the encrypted portion at the second computing system, and wherein the group identifier information for each of the one or more communication groups is different from each other, and wherein the group identifier information for each of the one or more communication groups is associated with different encryption mechanisms; and transfer the network packet to the second computing system.

2. The computing system of claim 1, wherein the program instructions further direct the processing system to maintain permissions information for communication requests by one or more applications on the computing system and, in response to the communication request, determine whether the communication request is permitted based on the private addressing information and the permissions information, and wherein generating the network packet to support the communication request comprises, when the communication request is permitted, generating the network packet to support the communication request.

3. The computing system of claim 2, wherein maintaining the permissions information for communication requests by the one or more applications on the computing system comprises obtaining, from a configuration system, the permissions information for the communication requests by the one or more applications on the computing system.

4. The computing system of claim 1, wherein the private addressing information comprises overlay network addressing information, and wherein the public addressing information comprises underlay network addressing information.

5. The computing system of claim 1, wherein the group identifier information further comprises supplemental decryption information to decrypt the encrypted portion of the network packet at the second computing system.

6. The computing system of claim 5, wherein the supplemental decryption information comprises an encrypted portion length, a sequence number for the network packet, a keyed-hash message authentication code (HMAC), a peer identifier (peerID), and/or an initialization vector (IV) or seed.

7. The computing system of claim 1, wherein the private addressing information and the public addressing information each comprise at least a source internet protocol (IP) address, a source media access control (MAC) address, a destination IP address, and destination MAC address.

8. The computing system of claim 7, wherein the private addressing information comprises different source and destination IP addresses and different source and destination MAC addresses than the public addressing information.

9. The computing system of claim 1, wherein identifying the communication request from the application comprises identifying the communication request from the application at a virtual network interface for the application.

10. A method of operating a communication service on a computing system, the method comprising:

identifying a communication request from at least one application on the computing system to transfer data to at least one second application on a second computing system, wherein the communication request is associated with private addressing information to address the at least one second application, and wherein the at least one application and the at least one second application are associated with one or more communication groups;

determining whether the communication request is permitted, the determination being based on the private addressing information and maintained permissions information, the maintained permissions information indicative of available destinations for the communication request;

generating a network packet to support the communication request if it is determined the communication request is permitted, wherein the network packet comprises an encrypted portion and a non-encrypted portion, wherein the encrypted portion comprises the data and the private addressing information, wherein the non-encrypted portion comprises public addressing information to address the second computing system and group identifier information, and wherein the group identifier information indicates at least an identifier for one of the one or more communication groups to decrypt the encrypted portion at the second computing system, and wherein the group identifier information for each of the one or more communication groups is different from each other, and wherein the group identifier information for each of the one or more communication groups is associated with different encryption mechanisms; and transferring the network packet to the second computing system.

11. The method of claim 10 further comprising maintaining permissions information for communication requests by one or more applications on the computing system and, in response to the communication request, determine whether the communication request is permitted based on the private addressing information and the permissions information, and wherein generating the network packet to support the communication request comprises, when the communication request is permitted, generating the network packet to support the communication request.

12. The method of claim 11, wherein maintaining the permissions information for communication requests by the one or more applications on the computing system comprises obtaining, from configuration system, the permissions information for the communication requests by the one or more applications on the computing system.

13. The method of claim 10, wherein the private addressing information comprises overlay network addressing information, and wherein the public addressing information comprises underlay network addressing information.

14. The method of claim 10, wherein the group identifier information further comprises supplemental decryption information to decrypt the encrypted portion of the network packet at the second computing system.

15. The method of claim 14, wherein the supplemental decryption information comprises an encrypted portion length, a sequence number for the network packet, a keyed-hash message authentication code (HMAC), a peer identifier (peerID), and/or an initialization vector (IV) or seed.

16. The method of claim 10, wherein the private addressing information and the public addressing information each comprise at least a source internet protocol (IP) address, a source media access control (MAC) address, a destination IP address, and destination MAC address.

17. The method of claim 16, wherein the private addressing information comprises different source and destination IP addresses and different source and destination MAC addresses than the public addressing information.

18. The method of claim 10, wherein identifying the communication request from the application comprises identifying the communication request from the application at a virtual network interface for the application.

19. An apparatus comprising:
one or more non-transitory computer readable storage media; and
program instructions stored on the one or more non-transitory computer readable storage media to provide secure packet communications that, when read and executed by a processing system, direct the processing system to:
identify a communication request from at least one application on the computing system to transfer data to at least one second application on a second computing system, wherein the communication request is associated with private addressing information to address the at least one second application, and wherein the at least one application and the at least one second application are associated with one or more communication groups;
determine whether the communication request is permitted, the determination being based on the private addressing information and maintained permissions information, the maintained permissions information indicative of available destinations for the communication request;
generate a network packet to support the communication request if it is determined the communication request is permitted, wherein the network packet comprises an encrypted portion and a non-encrypted portion, wherein the encrypted portion comprises the data and the private addressing information, wherein the non-encrypted portion comprises public addressing information to address the second computing system and group identifier information, and wherein the group identifier information indicates at least an identifier for one of the one or more communication groups to decrypt the encrypted portion at the second computing system, and wherein the group identifier information for each of the one or more communication groups is different from each other, and wherein the group identifier information for each of the one or more communication groups is associated with different encryption mechanisms; and
transfer the network packet to the second computing system.

20. The apparatus of claim 19, wherein the private addressing information and the public addressing information each comprise at least a source internet protocol (IP) address, a source media access control (MAC) address, a destination IP address, and destination MAC address, and wherein the private addressing information comprises different source and destination IP addresses and different source and destination MAC addresses than the public addressing information.

* * * * *